(12) United States Patent
Maloum

(10) Patent No.: US 10,576,961 B2
(45) Date of Patent: Mar. 3, 2020

(54) METHOD FOR CONTROLLING AN ENERGY EQUIVALENCE FACTOR FOR A HYBRID MOTOR VEHICLE

(71) Applicant: RENAULT s.a.s., Boulogne-Billancourt (FR)

(72) Inventor: Abdelmalek Maloum, Chevilly Larue (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 143 days.

(21) Appl. No.: 15/738,633

(22) PCT Filed: Jun. 20, 2016

(86) PCT No.: PCT/FR2016/051500
§ 371 (c)(1),
(2) Date: Mar. 30, 2018

(87) PCT Pub. No.: WO2016/207528
PCT Pub. Date: Dec. 29, 2016

(65) Prior Publication Data
US 2018/0304880 A1    Oct. 25, 2018

(30) Foreign Application Priority Data

Jun. 25, 2015  (FR) .................................. 15 55874

(51) Int. Cl.
*B60W 10/06*   (2006.01)
*B60W 20/13*   (2016.01)
(Continued)

(52) U.S. Cl.
CPC ............. *B60W 20/13* (2016.01); *B60L 58/13* (2019.02); *B60W 10/06* (2013.01); *B60W 10/08* (2013.01);
(Continued)

(58) Field of Classification Search
CPC ......... A61B 34/30; A61B 34/35; A61B 34/37; A61B 34/70; A61B 34/71; A61B 90/06;
(Continued)

(56) References Cited

U.S. PATENT DOCUMENTS 6,166,449 A     12/2000  Takaoka et al.
7,388,364 B2 *   6/2008  Schweigert ............... H02J 3/32
                                                      324/142
(Continued)

FOREIGN PATENT DOCUMENTS

FR    2 988 674 A1    10/2013

OTHER PUBLICATIONS

Sciarretta et al., Optimal control of parallel hybrid electric vehicles, 2004, IEEE, p. 352-363 (Year: 2004).*
(Continued)

*Primary Examiner* — McDieunel Marc
(74) *Attorney, Agent, or Firm* — Oblon, McClelland, Maier & Neustadt, L.L.P.

(57) ABSTRACT

A method controls an energy equivalence factor of a motor vehicle including a heat engine and at least one electric motor powered by a storage battery. The method includes estimating a value of the energy equivalence factor proportional to a predetermined maximum value when the difference is lower than the threshold value or proportional to a predetermined minimum value when the difference is higher than the threshold value.

7 Claims, 1 Drawing Sheet

(51) Int. Cl.
*B60L 58/13* (2019.01)
*G05B 13/04* (2006.01)
*B60W 10/08* (2006.01)
*B60W 50/00* (2006.01)

(52) U.S. Cl.
CPC ..... *G05B 13/042* (2013.01); *B60W 2050/002* (2013.01); *B60W 2050/0013* (2013.01); *B60W 2050/0022* (2013.01); *B60W 2050/0025* (2013.01); *B60W 2510/244* (2013.01); *B60W 2710/244* (2013.01); *Y02T 10/52* (2013.01); *Y02T 10/6286* (2013.01); *Y02T 10/84* (2013.01)

(58) Field of Classification Search
CPC .............. A61B 90/361; A61B 90/1689; A61B 90/1692; A61B 2034/305; A61B 2090/066; A61B 17/29; A61B 2017/00017; A61B 2017/00207; A61B 2017/00477; A61B 2017/00725; B25J 9/1689; B25J 9/1692; G06F 19/00; G05B 2219/45123; Y10S 901/39; Y10S 901/40; Y10S 901/44; Y10S 901/45; Y10S 901/46; B60W 10/06
See application file for complete search history.

(56) References Cited

U.S. PATENT DOCUMENTS

| | | | | |
|---|---|---|---|---|
| 7,649,338 B2* | 1/2010 | Seo | ...................... | B60W 10/26 320/132 |
| 9,174,636 B2* | 11/2015 | Debert | .................. | B60W 10/08 |
| 9,783,190 B2* | 10/2017 | Ketfi-Cherif | ........... | B60L 1/003 |
| 9,796,370 B2* | 10/2017 | Debert | .................. | B60W 20/00 |
| 10,093,303 B2* | 10/2018 | Grider | .................. | B60W 10/06 |
| 2007/0139013 A1* | 6/2007 | Seo | ...................... | B60W 10/26 320/130 |
| 2007/0139015 A1* | 6/2007 | Seo | .................... | G01R 31/3828 320/132 |
| 2015/0149011 A1* | 5/2015 | Debert | .................. | B60W 10/08 701/22 |

OTHER PUBLICATIONS

Stockar et al, Energy-Optimal Control of Plug-in Hybrid Electric Vehicles for Real-World Driving Cycles, 2011, IEEE, p. 2949-2962 (Year: 2011).*

Mapelli et al., Energy control strategies comparison for a city car Plug-In HEV, 2009, IEEE, p. 3729-3734 (Year: 2009).*

Sciarretta et al., Control of hybrid electric vehicles, 2007, IEEE, p. 60-70 (Year: 2007).*

International Search Report and Written Opinion dated Sep. 15, 2016 in PCT/FR2016/051500 (with English translation of Search Report), 17 pages.

Jyh-Shin Chen, et al., "Learning Energy Management Strategy for Hybrid Electric Vehicles", Vehicle Power and Propulsion, IEEE Conference, XP10861297, Sep. 7, 2005, pp. 427-432.

* cited by examiner

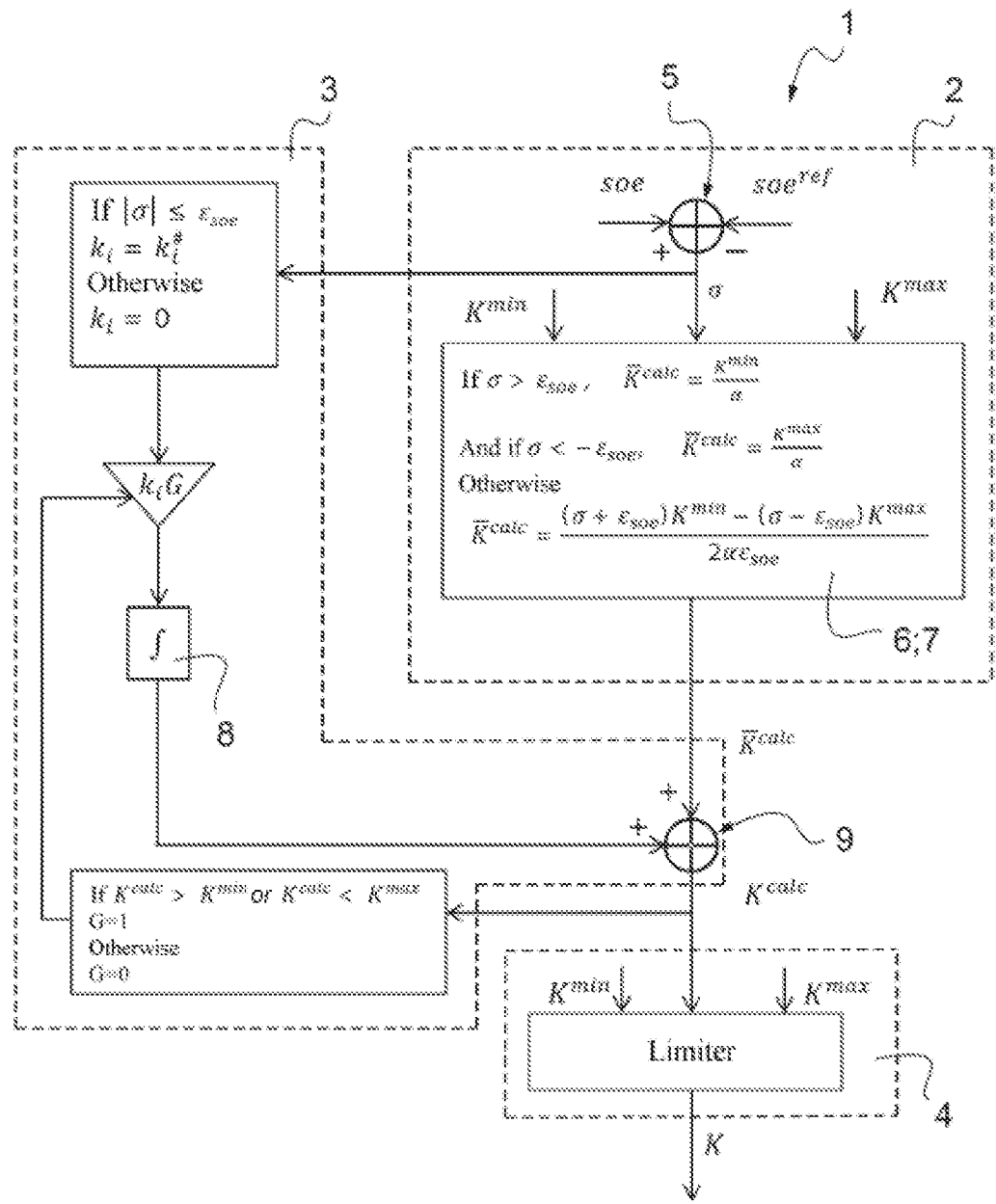

METHOD FOR CONTROLLING AN ENERGY EQUIVALENCE FACTOR FOR A HYBRID MOTOR VEHICLE

BACKGROUND

The present invention relates to a method for controlling an energy equivalence factor for a hybrid automobile vehicle.

The present invention relates to the management of the distribution of energy flows in a hybrid drive train of an automobile vehicle.

More precisely, the subject of the invention is the determination of an energy equivalence factor representing the weighting applied between the supply of heat energy and the supply of electrical energy, in order to minimize on one operating point the overall energy consumption of a hybrid drive train of an automobile vehicle, of the type comprising a heat engine and at least one electric motor powered by a battery.

A drive power train for an automobile vehicle with hybrid propulsion or drive comprises a heat engine and one or more electric machines, powered by at least one battery carried onboard the vehicle.

Control systems for hybrid drive power trains are designed to manage the operation and the synchronization of the various motors according to the driving conditions, in order to limit the fuel consumption and to minimize the emissions of polluting particles.

The 'management of the heat and electrical energy flows' is used to denote notably the drive strategy implemented in the control system with a view to optimizing the power sharing between the flow of heat energy and the flow of electrical energy. The principle implemented for choosing the best operating point consists in minimizing the sum of the heat consumption and of the electrical consumption by weighting the electrical energy with a weighting or equivalence factor.

This factor weights the electrical energy with the heat energy, in other words it gives the quantity of fuel needed to recharge a certain quantity of electrical energy stored in the battery or, conversely, the quantity of fuel that can be saved by using a certain quantity of energy coming from the battery.

The patent application FR2988674, filed by the present applicant, is notably known which discloses a method for controlling an equivalence factor implementing a proportional-integral regulation control, also called PI regulation.

However, in order to operate in an optimal manner, such a PI regulation control needs a prior knowledge of the system being regulated, together with its dynamic characteristics. From a technical point of view, this is the step for the calibration of the proportional-integral gains of the PI regulator. This calibration step is relatively long and must be carried out prior to the implementation of the control method.

Furthermore, this calibration is relatively complex, in particular as far as the calibration of the proportional gain is concerned, given that the dynamic characteristics of the system are, by definition, unknown at the time of the calibration.

Moreover, the calibration of the proportional gain cannot compensate for the extraneous effects not taken into account, in particular the power consumed by the auxiliary elements of the automobile vehicle, for example the onboard multimedia system, the air conditioning of the automobile vehicle, the data processors, etc.

For this reason, the calibration step is long and must be carried out each time the regulation control is applied to a different model of vehicle.

This makes this control method relatively costly to adapt to various models of automobile vehicles.

Accordingly, there exists a need for a method for controlling an energy equivalence factor that is simpler to adapt to various models of automobile vehicles.

BRIEF SUMMARY

A method is provided for controlling an energy equivalence factor corresponding to a weighting value applied between a supply of heat energy and a supply of electrical energy, in order to minimize on one operating point the overall energy consumption of a hybrid drive train for an automobile vehicle comprising a heat engine and at least one electric motor powered by an electrical accumulator.

The method comprises a step for estimating a value of said energy equivalence factor as a function of the difference between an instantaneous value of the energy state of the electrical accumulator and a target value of the energy state of the electrical accumulator.

The estimation step comprises:
- a step for comparing said difference with at least one positive threshold value and at least one negative threshold value, and
- a step for calculating the estimated value of the energy equivalence factor, said estimated value being:
  - proportional to a predetermined maximum value when said difference is less than said negative threshold value, or
  - proportional to a predetermined minimum value when said difference is greater than said positive threshold value, or
  - a function of said difference, of said negative and positive threshold values, and of the predetermined minimum and maximum values when said difference is in the range between the negative threshold value and the positive threshold value.

Thus, the estimation step is independent of the parameters of the system, in particular of the driving conditions and dynamic parameters of the automobile vehicle. In other words, the method is robust.

Furthermore, the system is adaptive in that the estimation step takes into account the difference, also referred to as the 'error', between an instantaneous value of the energy state of the electrical accumulator and a target value of the energy state of the electrical accumulator prior to evaluating an estimated value of the energy equivalence factor. In other words, the system to be controlled is studied before acting.

In this way, this method is relatively simple to adapt to different automobile vehicles. It may furthermore be used without it being necessary to know the driving conditions of the automobile vehicle.

Using the step for comparing said difference with at least one positive threshold value and at least one negative threshold value, the energy equivalence factor can be controlled in the charging and discharging modes of the electrical accumulator. Indeed, the sign of the difference depends, generally speaking, on the mode of operation of the electrical accumulator at the time of execution of the method.

When said difference is in the range between the negative threshold value and the positive threshold value, the estimated value of the energy equivalence factor may be controlled when the error is in the range between the two threshold values; in other words, when the error is small. Thus, the system is stabilized in such a manner as to optimize the overall energy operation of the automobile vehicle.

Furthermore, this control method allows response times to be obtained that are relatively high with respect to proportional-integral regulation controls.

Advantageously and in a non-limiting manner, said positive and negative threshold values are opposing. Thus, the operation of the method, notably its speed of execution, may be optimized by carrying out comparisons on the absolute values of the threshold values.

Advantageously and in a non-limiting manner, the control method comprises an integration step when said estimated value of the equivalence factor is in the is range between the negative and positive threshold values, said integration step defining an integrated term intended to be added to said estimated value.

In particular, the integrated term could be a function of the difference, also referred to as 'error'.

Notably, the integrated term could be proportional to a value of the integral of the error.

Thus, the variations of the energy equivalence factor may be smoothed, notably when the difference between the instantaneous value of the energy state of the electrical accumulator and the target value of the energy state of the electrical accumulator is relatively small.

Advantageously and in a non-limiting manner, the control method may comprise a step for limiting said estimated value of the energy equivalence factor during which said estimated value is limited by boundaries defined by said predetermined minimum value and by said predetermined maximum value.

It will be understood that reference is made here to the estimated value, whether it has, or has not, been summed, and hence modified, by an integrated term such as previously described.

Thus, a correct operation of the automobile vehicle is ensured, while ensuring that the energy equivalence factor is always within the range between acceptable limits of operation of the energy equivalence factor. This limitation step may also be considered as a step for saturation of the estimated value of the energy equivalence factor.

Notably, the risks of deterioration or of premature wearing of the electrical accumulator may thus be limited.

The invention also relates to a device for controlling an energy equivalence factor corresponding to a weighting value applied between a supply of heat energy and a supply of electrical energy, in order to minimize on one operating point the overall energy consumption of a hybrid drive train for an automobile vehicle comprising a heat engine and at least one electric motor powered by an electrical accumulator, said device comprising:

means for receiving an instantaneous value of the energy state of the electrical accumulator, for example a sensor of the electrical accumulator, or else a processor, a DSP, or a microcontroller implementing a model of operation of the electrical accumulator, and a bus for transmission of the data coming from the sensor, or any other suitable means, means for calculating a difference between said instantaneous value of the energy state of the electrical accumulator and a target value of the energy state of the electrical accumulator, for example a processor, a DSP, a microcontroller, or any other suitable means, means for comparing said difference with at least one positive threshold value and at least one negative threshold value, for example a processor, a DSP, a microcontroller, or any other suitable means, identical or not to the means for calculating the difference, means for calculating an estimated value of the energy equivalence factor, for example a processor, a DSP, a microcontroller, or any other suitable means, identical or not to the means for calculating the difference and/or to the means for comparing the difference with the at least one threshold value, said estimated value being:

proportional to a predetermined maximum value when said difference is less than said negative threshold value, or proportional to a predetermined minimum value when said difference is greater than said positive threshold value, or a function of said difference, of said negative and positive threshold values, and of the predetermined minimum and maximum values when said difference is in the range between the negative threshold value and the positive threshold value.

The invention also relates to an automobile vehicle comprising a device for controlling an energy equivalence factor such as previously described.

BRIEF DESCRIPTION OF THE DRAWINGS

Other features and advantages of the invention will become apparent to upon reading the description presented hereinafter of one particular embodiment of the invention, given by way of non-limiting example, with reference to the single FIGURE which shows a functional flow diagram of a method for controlling an energy equivalence factor according to one embodiment of the invention.

DETAILED DESCRIPTION

With reference to the single FIGURE, the control method 1 providing a control of the energy equivalence factor of a hybrid automobile vehicle comprises a step 2 for estimating a value $\overline{K}^{calc}$ of the energy equivalence factor K.

The estimation step 2 first of all comprises a first step 5 for calculating an error σ, in which the calculation is performed of the value of the difference σ, also commonly referred to as the error a, between the instantaneous value soe of the energy state of the electrical accumulator and the target value $soe^{ref}$ of the energy state of the electrical accumulator.

The calculation 5 of the error σ is carried out by the subtraction soe−$soe^{ref}$ of the target value $soe^{ref}$ from the instantaneous value soe of the energy state.

The error σ may be a positive or negative value.

Generally speaking, the error σ is negative when the target value $soe^{ref}$ is small, for example between 0% and 10% of the maximum value of the energy state of the electrical accumulator. In this case, the control will aim to discharge the electrical accumulator, and hence to promote the consumption of electrical energy.

In the opposite case, the error σ is positive when the target value $soe^{ref}$ is large, for example between 90% and 100% of the maximum value of the energy state of the electrical accumulator. In this case, the control will aim to recharge the electrical accumulator.

After the error calculation step 5, a step is carried out for comparison 6 between the error σ and two threshold values $\varepsilon_{soe}$, $-\varepsilon_{soe}$.

Here, the error σ is compared with two threshold values, a positive threshold value $\varepsilon_{soe}$, and a negative threshold value $-\varepsilon_{soe}$.

The two threshold values are opposing. In other words, the two threshold values $\varepsilon_{soe}$, $-\varepsilon_{soe}$ are equal in absolute value.

According to one alternative, the two threshold values may have different absolute values.

Preferably, the threshold values $\varepsilon_{soe}$, $-\varepsilon_{soe}$ are close to zero in absolute value, for example in the range between 0 and 1.

The comparison step 6 differentiates three cases:
Where the error σ is less than the negative threshold value $-\varepsilon_{soe}$;
Where the error σ is greater than the positive threshold value $\varepsilon_{soe}$;
Where the error σ is in the range between the negative threshold value $-\varepsilon_{soe}$ and the positive threshold value $\varepsilon_{soe}$.

Depending on the result of the comparison step 6, a step 7 for calculation of the estimated value $\overline{K}^{calc}$ of the energy equivalence factor K is then carried out.

If the error σ is less than the negative threshold value $-\varepsilon_{soe}$, the estimated value $\overline{K}^{calc}$ is determined by the following calculation:

$$\overline{K}^{calc} = \frac{K^{max}}{\alpha} \quad (1)$$

in which:
$K^{max}$ is a maximum acceptable value of the equivalence factor, and
α is a predetermined value greater than 1.

The value α is a pre-calibrated and constant value.

If the error σ is greater than the positive threshold value $\varepsilon_{soe}$, the estimated value $\overline{K}^{calc}$ is determined by the following calculation:

$$\overline{K}^{calc} = \frac{K^{min}}{\alpha} \quad (2)$$

in which:
$K^{min}$ is a minimum acceptable value of the equivalence factor.

The maximum acceptable value $K^{max}$ and minimum acceptable value $K^{min}$ of the energy equivalence factor are predetermined depending on the electrical accumulator. In other words, these values are operating constants of the electrical accumulator.

If the error σ is in the range between the negative threshold value $-\varepsilon_{soe}$ and the positive threshold value $\varepsilon_{soe}$, the estimated value $\overline{K}^{calc}$ is determined by the following calculation:

$$\overline{K}^{calc} = \frac{(\sigma + \varepsilon_{soe})K^{min} - (\sigma - \varepsilon_{soe})K^{max}}{2\alpha\varepsilon_{soe}} \quad (3)$$

According to one alternative, the error σ could be compared with a single threshold value $\varepsilon_{soe}$, for example a value close to zero, less than or greater than zero, or else equal to zero.

In this alternative, the comparison step 6 and calculation step 7 will be similar to those previously described for two threshold values, with the exception that the comparison 6 will only take into account the case where the error σ is greater or less than the single threshold value $\varepsilon_{soe}$; and the calculation step 7 will only then consider the first two calculations (1) and (2) previously described, by simply substituting the negative and positive values with the single threshold value, the third calculation (3) only being appropriate when two threshold values are taken into account.

Thus, the estimated value $\overline{K}^{calc}$ of the energy equivalence factor is obtained by a robust estimation step 2.

In other words, a value of the energy equivalence factor is estimated independently of the driving conditions of the automobile vehicle, or of the physical parameters of the automobile vehicle.

This estimation step 2 is consequently relatively simple to adapt to various systems and does not require any complex and costly calibration in order to function.

Furthermore, the estimation step 2 is adaptive. This is because, during this step, the error σ is estimated prior to evaluating the estimated value $\overline{K}^{calc}$. In other words, the present method studies the system prior to acting.

In this way, a value $\overline{K}^{calc}$ of the energy equivalence factor may be estimated in a robust and adaptive manner.

After having estimated the value $\overline{K}^{calc}$ of the energy equivalence factor K, during the estimation step 2, the method carries out an integration step 3.

During the integration step 3, an integrated term 8 is determined as a function of the error σ:
if the error σ is in the range between the negative threshold value $-\varepsilon_{soe}$ and the positive threshold value $\varepsilon_{soe}$, the integrated term 8 is a function of a predefined gain $k_iG$. In other words, the integrated term 8 corresponds, after a Laplace transform, to the function $$\frac{1}{p}k_iG\sigma;$$

and
if the error σ is less than the negative threshold value $-\varepsilon_{soe}$ or if the error σ is greater than the positive threshold value $\varepsilon_{soe}$, the integrated term 8 is equal to zero.

After having determined the integrated term 8, it is added to the estimated value $\overline{K}^{calc}$ during a step 9 for summing the integration step 3, as a function of the value of the error σ, such as described hereinabove.

The integration step 3 allows the variation of the energy equivalence factor K to be smoothed when the instantaneous value soe of the energy state of the electrical accumulator is relatively close to the target energy state $soe^{ref}$. At the end of the integration step, a smoothed value $K^{calc}$ of the estimated value $\overline{K}^{calc}$ is obtained.

Indeed, the positive threshold values $\varepsilon_{soe}$ and negative threshold values $-\varepsilon_{soe}$ are values that are relatively close to zero, defining thresholds between which the error σ is considered as small. The idea is then to stabilize the variations of the energy equivalence factor K in order to optimize the overall energy consumption.

After the integration step 3, a limitation step 4 is carried out, during which it is verified that the smoothed value $K^{calc}$ is in the range between the maximum acceptable value $K^{max}$ and minimum acceptable value $K^{min}$ of the energy equivalence factor. If the smoothed value $K^{calc}$ goes outside of these limits, it is brought back to the nearest maximum or minimum value.

In other words, a saturation 4 of the smoothed values $K^{calc}$ is carried out in order to keep them between the maximum acceptable values $K^{max}$ and minimum acceptable values $K^{min}$ of the energy equivalence factor. This allows a correct operation of the system to be ensured at all times during operation, notably in such a manner as not to cause any risk of deterioration of the electrical accumulator.

The value obtained after the limitation step 4 corresponds to the value of the energy equivalence factor K controlled by the method.

The invention is in no way limited to the embodiment described.

In particular, the integration step 3 and limitation step 4 are optional steps, which may or may not be present, independently of one another, of the control is method 1 implemented.

The invention claimed is:

1. A method for controlling an energy equivalence factor corresponding to a weighting value applied between a supply of heat energy and a supply of electrical energy, in order to minimize on one operating point an overall energy consumption of a hybrid drive train for an automobile vehicle comprising a heat engine and at least one electric motor powered by an electrical accumulator, the method comprising:
   estimating a value of said energy equivalence factor as a function of a difference between an instantaneous value of an energy state of the electrical accumulator and a target value of the energy state of the electrical accumulator, wherein estimating includes:
      comparing said difference with at least one positive threshold value and at least one negative threshold value, and
      calculating, using processing circuitry, the estimated value of the energy equivalence factor, said estimated value being:
         proportional to a predetermined maximum value when said difference is less than said negative threshold value, or
         proportional to a predetermined minimum value when said difference is greater than said positive threshold value, or
         a function of said difference, of said negative threshold value and said positive threshold value, and of the predetermined minimum and maximum values when said difference is in a range between the negative threshold value and the positive threshold value.

2. The control method as claimed in claim 1, wherein said positive threshold value and said negative threshold value are opposing.

3. The control method as claimed in claim 1, further comprising:
   integrating when said estimated value of the equivalence factor is in the range between the negative threshold value and said positive threshold value, said integrating defining an integrated term to be added to said estimated value.

4. The control method as claimed in claim 1, further comprising:
   limiting said estimated value of the energy equivalence factor during which said estimated value is limited by boundaries defined by said predetermined minimum value and by said predetermined maximum value.

5. A device for controlling an energy equivalence factor corresponding to a weighting value applied between a supply of heat energy and a supply of electrical energy, in order to minimize on one operating point an overall energy consumption of a hybrid drive train for an automobile vehicle comprising a heat engine and at least one electric motor powered by an electrical accumulator, said device comprising:
   means for receiving an instantaneous value of an energy state of the electrical accumulator;
   means for calculating a difference between said instantaneous value of the energy state of the electrical accumulator and a target value of the energy state of the electrical accumulator;
   means for comparing said difference with at least one positive threshold value and at least one negative threshold value; and
   means for calculating an estimated value of the energy equivalence factor, said estimated value being:
      proportional to a predetermined maximum value when said difference is less than said negative threshold value, or
      proportional to a predetermined minimum value when said difference is greater than said positive threshold value, or
      a function of said difference, of said negative threshold value and positive threshold value, and of the predetermined minimum and maximum values when said difference is in the range between the negative threshold value and the positive threshold value.

6. An automobile vehicle comprising:
   the device for controlling the energy equivalence factor as claimed in claim 5.

7. A device for controlling an energy equivalence factor corresponding to a weighting value applied between a supply of heat energy and a supply of electrical energy, in order to minimize on one operating point an overall energy consumption of a hybrid drive train for an automobile vehicle comprising a heat engine and at least one electric motor powered by an electrical accumulator, said device comprising:
   circuitry configured to:
      retrieve an instantaneous value of an energy state of the electrical accumulator;
      calculate a difference between said instantaneous value of the energy state of the electrical accumulator and a target value of the energy state of the electrical accumulator;
      compare said difference with at least one positive threshold value and at least one negative threshold value; and
      calculate an estimated value of the energy equivalence factor, said estimated value being:
         proportional to a predetermined maximum value when said difference is less than said negative threshold value, or
         proportional to a predetermined minimum value when said difference is greater than said positive threshold value, or
         a function of said difference, of said negative threshold value and positive threshold value, and of the predetermined minimum and maximum values when said difference is in the range between the negative threshold value and the positive threshold value.

* * * * *